(12) United States Patent
Kaida

(10) Patent No.: US 10,953,947 B2
(45) Date of Patent: Mar. 23, 2021

(54) HANDLEBAR SWITCH

(71) Applicant: HONDA MOTOR CO., LTD., Tokyo (JP)

(72) Inventor: Yohei Kaida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/827,199

(22) Filed: Mar. 23, 2020

(65) Prior Publication Data

US 2020/0339211 A1 Oct. 29, 2020

(30) Foreign Application Priority Data

Apr. 24, 2019 (JP) .............................. JP2019-083358

(51) Int. Cl.
*H01H 9/06* (2006.01)
*B62K 11/14* (2006.01)
*B62K 21/12* (2006.01)

(52) U.S. Cl.
CPC ............... *B62K 11/14* (2013.01); *H01H 9/06* (2013.01); *B62K 21/12* (2013.01); *H01H 2009/068* (2013.01)

(58) Field of Classification Search
CPC .......... B62K 11/14; B62K 21/12; H01H 9/06; H01H 2009/068; H01H 25/04; H01H 2300/01; H01H 23/00; H01H 11/0006; H01H 2237/004; H01H 2300/012; H01H 2221/012; H01H 25/008; H01H 13/705; H01H 23/145; H01H 13/14
See application file for complete search history.

(56) References Cited

U.S. PATENT DOCUMENTS

2016/0293360 A1\* 10/2016 Osanai ................. H01H 25/041
2020/0062332 A1 2/2020 Osanai et al.

FOREIGN PATENT DOCUMENTS

WO WO 2018/134989 A1 7/2018

\* cited by examiner

*Primary Examiner* — Ahmed M Saeed
(74) *Attorney, Agent, or Firm* — Birch, Stewart, Kolasch & Birch, LLP

(57) ABSTRACT

To provide a handlebar switch that can achieve reduction in size of a switch case, while ensuring operability of switches that increase in number, a handlebar switch includes switch cases disposed on a handlebar inside a handlebar grip in a vehicle width direction and a plurality of switches disposed on the switch cases. The switches include direction switches that specify up, down, left, and right directions. The direction switches disposed to form one vertical row include a pair of upper and lower depressing up and down switches that specify up and down directions, respectively, and a tilting left-right switch that is disposed between the up and down switches and that specifies a left or right direction. Other switches are disposed at the left and right of the direction switches.

11 Claims, 7 Drawing Sheets

HANDLEBAR SWITCH

TECHNICAL FIELD

The present invention relates generally to handlebar switches and, more particularly, to a handlebar switch configured as a switch case that is mounted on a steering handlebar and in which a plurality of switches are disposed.

BACKGROUND ART

Various types of switch case configurations have hitherto been devised to respond to an increasing number of switches in the handlebar switch configured as a switch case that is mounted on a steering handlebar and in which a plurality of switches are disposed.

Patent Document 1 discloses a configuration in which a sub-switch case including a plurality of switches is disposed adjacent on the inside in a vehicle width direction to a switch case mounted on a handlebar that constitutes a steering handlebar.

CITATION LIST

Patent Literature
    Patent Document 1: WO 2018/134989 A

SUMMARY OF INVENTION

Technical Problem

The configuration disclosed in Patent Document 1 entails a need to improve operability because of a great distance between the handlebar grip and the switch. Additionally, providing the sub-switch case poses a problem of an increased disposition space.

It is an object of the present invention to solve the foregoing problems of the known art and to provide a handlebar switch that can achieve reduction in size of the switch case, while ensuring operability of switches that increase in number.

Solution to Problems

To achieve the afore-mentioned object, the present invention has a first feature in that a handlebar switch (40) comprises switch cases (45, 46) disposed on a handlebar (4a) inside a handlebar grip (4b) in a vehicle width direction; and a plurality of switches (S) disposed on the switch cases (45, 46), wherein the switches (S) include direction switches (60, 61, 62) that specify directions of up, down, left, and right, and the direction switches (60, 61, 62) are disposed to form one vertical row.

To achieve the afore-mentioned object, the present invention has a second feature in that the direction switches (60, 61, 62) include a pair of upper and lower depressing up and down switches (60, 62) that specify up and down directions, respectively, and a tilting left-right switch (61) that is disposed between the up and down switches (60, 62) and that specifies a left or right direction, and other switches (63, 64, 65, 66, 67, 68) are disposed at left and right of the direction switches (60, 61, 62).

To achieve the afore-mentioned object, the present invention has a third feature in that the up and down switches (60, 62) have operating surfaces (60a, 62a) formed to have a protrusion amount protruding toward a rear of a vehicle body and increasing at increasing distances upward and downward, respectively, from the left-right switch (61) when viewed in an axial direction of the handlebar (4a).

To achieve the afore-mentioned object, the present invention has a fourth feature in that the left-right switch (61) includes an operating portion (61a) that protrudes posteriorly in the vehicle body, and the operating portion (61a) has a posterior side end portion protruding posteriorly in the vehicle body relative to the operating surfaces (60a, 62a) of the up and down switches (60, 62).

To achieve the afore-mentioned object, the present invention has a fifth feature in that the other switches (63, 64, 65) disposed outside the direction switches (60, 61, 62) in the vehicle width direction include an enter switch (64) that validates a choice made by operating the direction switches (60, 61, 62) and operating switches (63, 65) that operate electric components disposed in a vehicle.

To achieve the afore-mentioned object, the present invention has a sixth feature in that the direction switches (60, 61, 62) and the other switches (63, 64, 65, 66, 67, 68) each have an operating surface configured so as to be located posteriorly in the vehicle width direction toward an inside in the vehicle width direction in a vehicle top view.

To achieve the afore-mentioned object, the present invention has a seventh feature in that the handlebar switch further comprises at least one of tilting upper-portion switches (71, 72) disposed on an upper surface of the switch cases (45, 46), the upper-portion switches (71, 72) including operators protruding superiorly in the vehicle body, wherein the upper-portion switches (71, 72) have tilting axes (71a, 72a) tilted such that, in the vehicle top view, an outside end portion in the vehicle width direction of the tilting axes (71a, 72a) is located anteriorly in the vehicle body relative to an inside end portion in the vehicle width direction of the tilting axes (71a, 72a).

To achieve the afore-mentioned object, the present invention has an eighth feature in that the switch cases (45, 46) include a rear-side case (45) on a posterior side in the vehicle body and a front-side case (46) on an anterior side in the vehicle body, the rear-side case (45) has an upper surface (45a) inclined superiorly in the vehicle body toward a front, the front-side case (46) has an upper surface (46a) inclined inferiorly in the vehicle body toward the front, and the upper-portion switches (71, 72) are disposed on the upper surface (46a) of the front-side case (46) at a position lower than the upper surface (45a) of the rear-side case (45) when viewed in the axial direction of the handlebar (4a).

Effects of Invention

According to the first feature of the present invention, a handlebar switch (40) comprises switch cases (45, 46) disposed on a handlebar (4a) inside a handlebar grip (4b) in a vehicle width direction; and a plurality of switches (S) disposed on the switch cases (45, 46), wherein the switches (S) include direction switches (60, 61, 62) that specify directions of up, down, left, and right, and the direction switches (60, 61, 62) are disposed to form one vertical row. Therefore, a crosswise width of the direction switches can be reduced, so that other switches can be disposed close to, and on the left and right of, the direction switches, and reduction in size of the handlebar switch can be promoted, while disposing a plurality of switches.

According to the second feature of the present invention, the direction switches (60, 61, 62) include a pair of upper and lower depressing up and down switches (60, 62) that specify up and down directions, respectively, and a tilting left-right switch (61) that is disposed between the up and down switches (60, 62) and that specifies a left or right direction, and other switches (63, 64, 65, 66, 67, 68) are disposed at left and right of the direction switches (60, 61, 62). Integrating the switch that specifies the left or right direction in a single tilting switch enables the direction switches specifying up, down, left, and right directions to be disposed in one vertical row. The handlebar switch can thus be reduced in size with the other switches being disposed at the left and right of the direction switches.

According to the third feature of the present invention, the up and down switches (60, 62) have operating surfaces (60a, 62a) formed to have a protrusion amount protruding toward a rear of a vehicle body and increasing at increasing distances upward and downward, respectively, from the left-right switch (61) when viewed in an axial direction of the handlebar (4a). This enhances a sense of fit of a finger in the up and down switches, enhancing operability and preventing an erroneous operation.

According to the fourth feature of the present invention, the left-right switch (61) includes an operating portion (61a) that protrudes posteriorly in the vehicle body, and the operating portion (61a) has a posterior side end portion protruding posteriorly in the vehicle body relative to the operating surfaces (60a, 62a) of the up and down switches (60, 62). Therefore, the up and down switches can be prevented from being mistakenly operated when the left-right switch is to be operated.

According to the fifth feature of the present invention, the other switches (63, 64, 65) disposed outside the direction switches (60, 61, 62) in the vehicle width direction include an enter switch (64) that validates a choice made by operating the direction switches (60, 61, 62) and operating switches (63, 65) that operate electric components disposed in a vehicle. Therefore, frequently used switches, such as the enter switch that performs a selected menu displayed on a screen, a horn switch, and a favorite switch that performs any assigned function, can be disposed at positions that are close to the handlebar grip and at which the switches can readily be operated. Operability of the handlebar switch can thereby be enhanced.

According to the sixth feature of the present invention, the direction switches (60, 61, 62) and the other switches (63, 64, 65, 66, 67, 68) each have an operating surface configured so as to be located posteriorly in the vehicle width direction toward an inside in the vehicle width direction in a vehicle top view. Disposing the operating surface of each switch at more posterior positions in the vehicle body at distances increasing from the handlebar grip toward the inside in the vehicle width direction facilitates operations of the switches with the hand holding the handlebar grip, so that an erroneous operation can be prevented.

According to the seventh feature of the present invention, the handlebar switch further comprises at least one of tilting upper-portion switches (71, 72) disposed on an upper surface of the switch cases (45, 46), the upper-portion switches (71, 72) including operators protruding superiorly in the vehicle body, wherein the upper-portion switches (71, 72) have tilting axes (71a, 72a) tilted such that, in the vehicle top view, an outside end portion in the vehicle width direction of the tilting axes (71a, 72a) is located anteriorly in the vehicle body relative to an inside end portion in the vehicle width direction of the tilting axes (71a, 72a). This configuration enables the upper-portion switch that can readily be operated with the forefinger of the hand that holds the handlebar grip to be disposed on the upper surface of the switch cases.

According to the eighth feature of the present invention, the switch cases (45, 46) include a rear-side case (45) on a posterior side in the vehicle body and a front-side case (46) on an anterior side in the vehicle body, the rear-side case (45) has an upper surface (45a) inclined superiorly in the vehicle body toward a front, the front-side case (46) has an upper surface (46a) inclined inferiorly in the vehicle body toward the front, and the upper-portion switches (71, 72) are disposed on the upper surface (46a) of the front-side case (46) at a position lower than the upper surface (45a) of the rear-side case (45) when viewed in the axial direction of the handlebar (4a). Therefore, disposing the upper-portion switch on the upper surface of the front-side case which is one step lower than the upper surface of the rear-side case, can provide the upper-portion switch that can be operated easily when the forefinger is intentionally stretched and that is less likely to be mistakenly operated.

MODE FOR CARRYING OUT THE INVENTION

Figure 1:
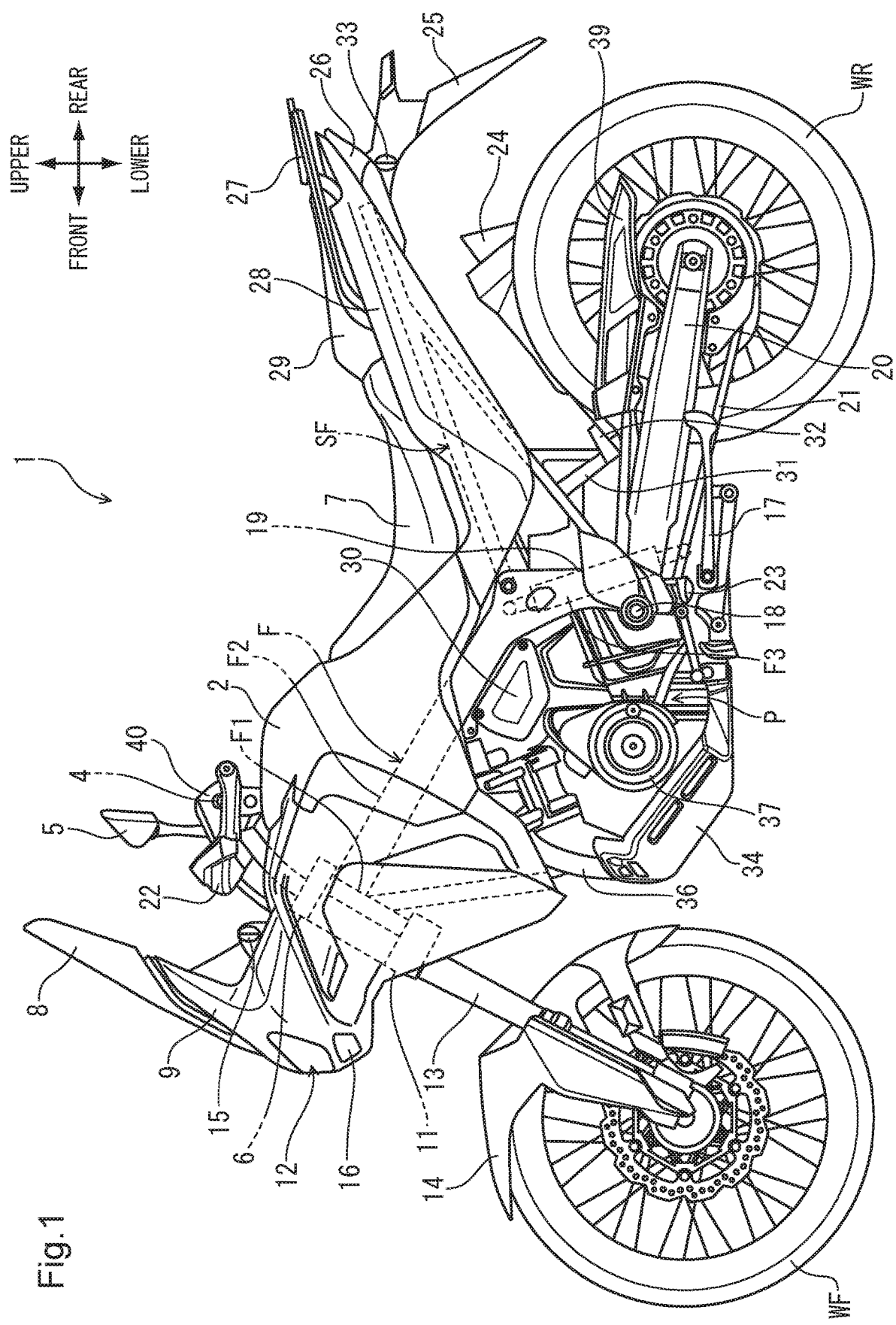
FIG. 1 is a left side view of a motorcycle, to which a handlebar switch according to an embodiment of the present invention is applied.

Hereinafter, a preferred embodiment according to the present invention will be described with reference to the accompanying drawings. FIG. 1 is a left side view of a motorcycle 1, to which a handlebar switch 40 according to an embodiment of the present invention is applied. The motorcycle 1 is a dual-purpose type saddled vehicle that travels by transmitting a drive force of a power unit P, which integrates an engine with a transmission, to a rear wheel WR with a drive chain 21. A head pipe F1, which oscillatably journals a steering shaft not illustrated, is disposed at a vehicle body anterior end portion of a pair of left and right main frames F2 which constitute a vehicle body frame F. A pair of left and right front forks 13, which journal a front wheel WF rotatably, is supported by a top bridge 6 and a bottom bridge 11 which are fixed to the steering shaft at upper and lower portions of the head pipe F1. A steering handlebar 4 is fixed to the top bridge 6. A pair of left and right rearview mirrors 5 and a pair of left and right knuckle guards 22 are mounted on the steering handlebar 4. The handlebar switch 40 according to the embodiment of the present invention is mounted on a left-hand side in a vehicle width direction of the steering handlebar 4.

A front cowl 9, which supports a headlight 12 and a screen 8, covers the steering handlebar 4 from the front. A pair of left and right front-side blinker devices 15 is disposed between the front cowl 9 and the steering handlebar 4. A cornering light 16 is disposed inferior to the headlight 12. A front fender 14, which covers an upper portion of the front wheel WF, is fixed to the front forks 13.

The power unit P is disposed at a lower portion of the main frames F2. An under cover 34, which protects front portions and lower portions of a crankcase 37 and an exhaust pipe 36, is disposed at a lower portion of the power unit P. Combustion gas of the power unit P is discharged from a muffler 24, disposed on the right in the vehicle width direction, via the exhaust pipe 36.

A pair of left and right pivot frames F3 is connected with lower portions of rear ends of the main frames F2. The pivot frames F3 support a pivot 18 of a swing arm 20 which rotatably journals the rear wheel WR. The pivot 18 swingably journals a front end portion of the swing arm 20. The swing arm 20 is suspended on the main frames F2 by a rear cushion 19 at a position posterior to the pivot 18. A pair of left and right footrest steps 23 is mounted at lower end portions of the pivot frames F3. A side stand 17 is swingably journaled at a position posterior to the footrest step 23 on the left-hand side in the vehicle width direction. A chain cover 39, which covers the drive chain 21 from above, is mounted above the swing arm 20. A cover member 30 is disposed at a position anterior to the pivot frames F3 and between the main frames F2 and the power unit P. The cover member 30 is intended for an electric component box that houses, for example, an in-vehicle battery.

A fuel tank 2 is disposed at the upper portions of the main frames F2. A seat frame SF, which extends posteriorly and superiorly in the vehicle body, is connected to the rear portions of the main frames F2. A pair of left and right pillion step holders 31 is mounted at a lower portion of the seat frame SF. The pillion step holders 31 support respective pillion steps 32.

A front-side seat 7 and a rear-side seat 29 are disposed posterior to the fuel tank 2. The front-side seat 7 and the rear-side seat 29 are supported by the seat frame SF. A rear cowl 28 covers outer sides in the vehicle width direction of the seat frame SF. A rear carrier 27, which is supported by the seat frame SF, is disposed outside in the vehicle width direction of the rear-side seat 29. A taillight device 26 and a rear fender 25 are disposed posterior to the rear cowl 28. A pair of left and right rear-side blinker devices 33 is disposed at a base portion of the rear fender 25.

Figure 2:
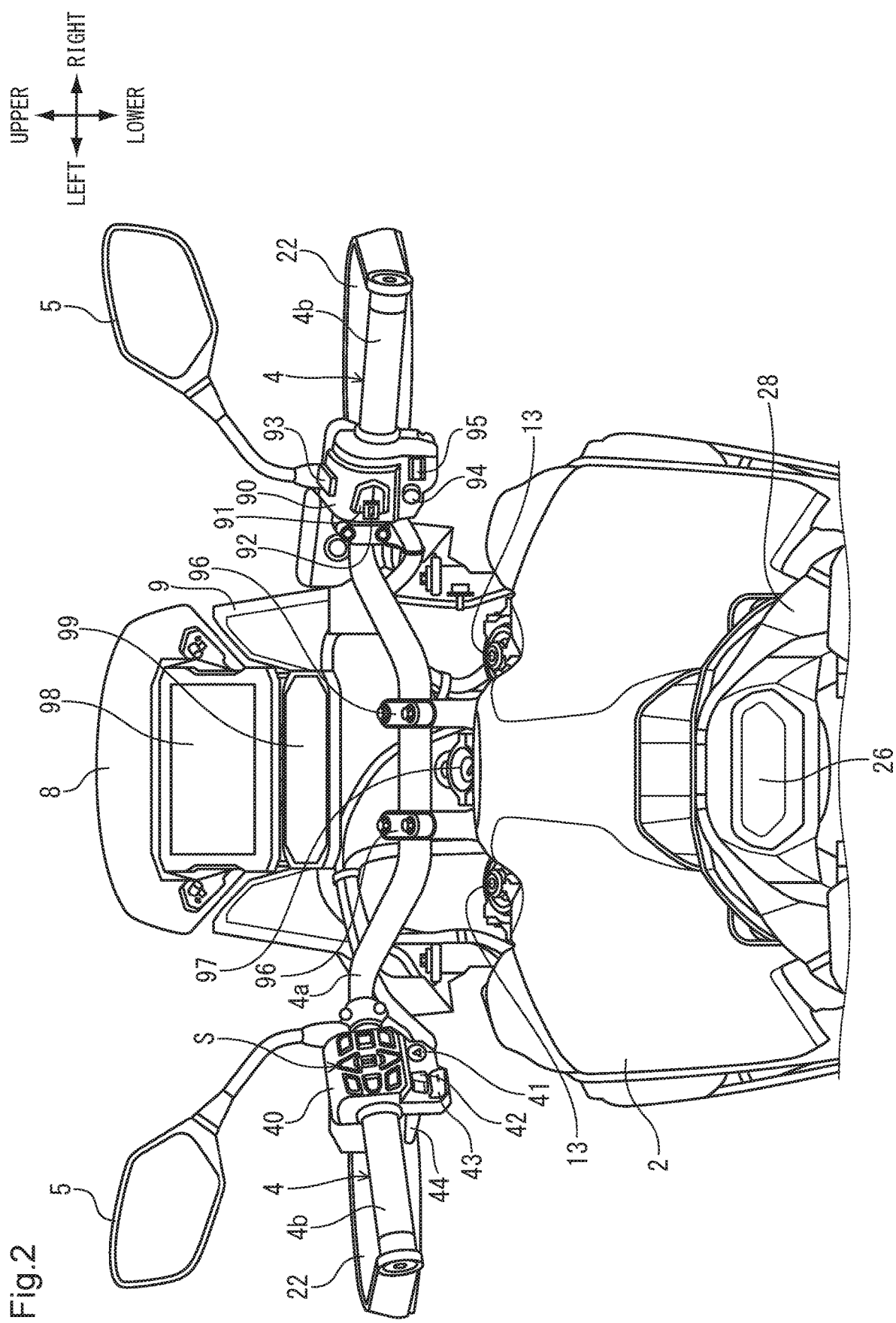
FIG. 2 is a partly enlarged rear view of the motorcycle.

FIG. 2 is a partly enlarged rear view of the motorcycle 1. A pair of left and right handlebar clamps 96 is disposed above the top bridge 6 which supports the left and right front forks 13. A handlebar 4a is fixed to the handlebar clamps 96. The handlebar 4a extends in the vehicle width direction and constitutes the steering handlebar 4. An ignition switch 97 is disposed between the left and right handlebar clamps 96. A meter device 98 and a multi-display 99, which displays, for example, operation menus for various functions, are disposed anterior to the steering handlebar 4.

Handlebar grips 4b, formed of, for example, rubber, are mounted on both end portions of the handlebar 4a. A left-side handlebar switch 40 and a right-side handlebar switch 90 are disposed inside in the vehicle width direction of the respective handlebar grips 4b.

A neutral/drive mode changeover switch 91, an automatic/manual mode changeover switch 92, an engine start/kill switch 93, a cruise control activation switch 94, and a cruise speed adjustment switch 95 are disposed on the right-side handlebar switch 90.

A hazard lamp switch 41, a flasher lamp switch 42, and a downshift switch 43 are disposed inferior to a plurality of switches S, which include a total of nine switches, on the left-side handlebar switch 40. An upshift switch 44 is disposed anterior to the downshift switch 43. The left-side handlebar switch 40 (hereinafter referred to simply as the handlebar switch) according to the present embodiment is characterized by the disposition of the switches S.

Figure 3:
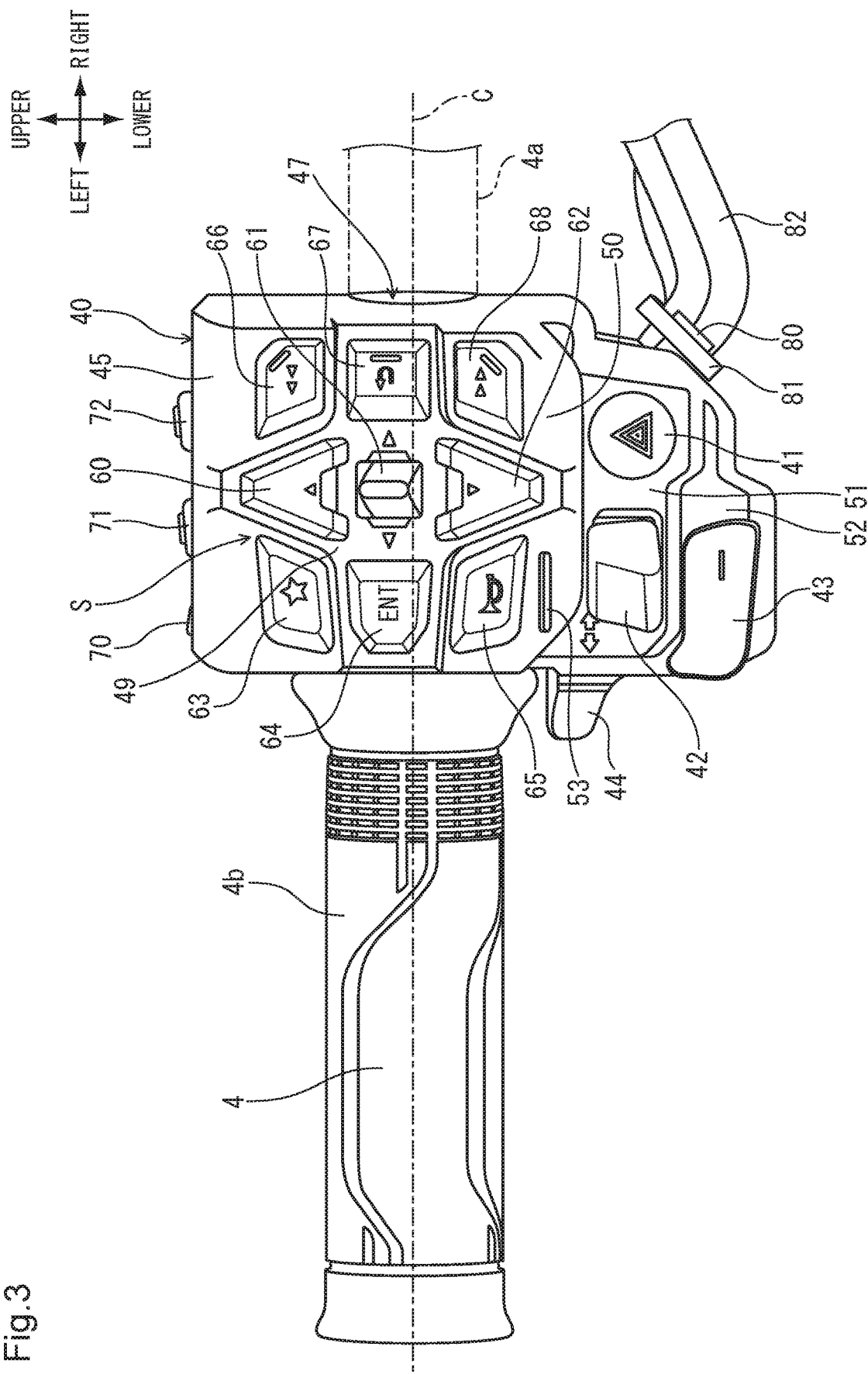
FIG. 3 is a front view of the handlebar switch, as viewed from the rear of the vehicle body.
Figure 4:
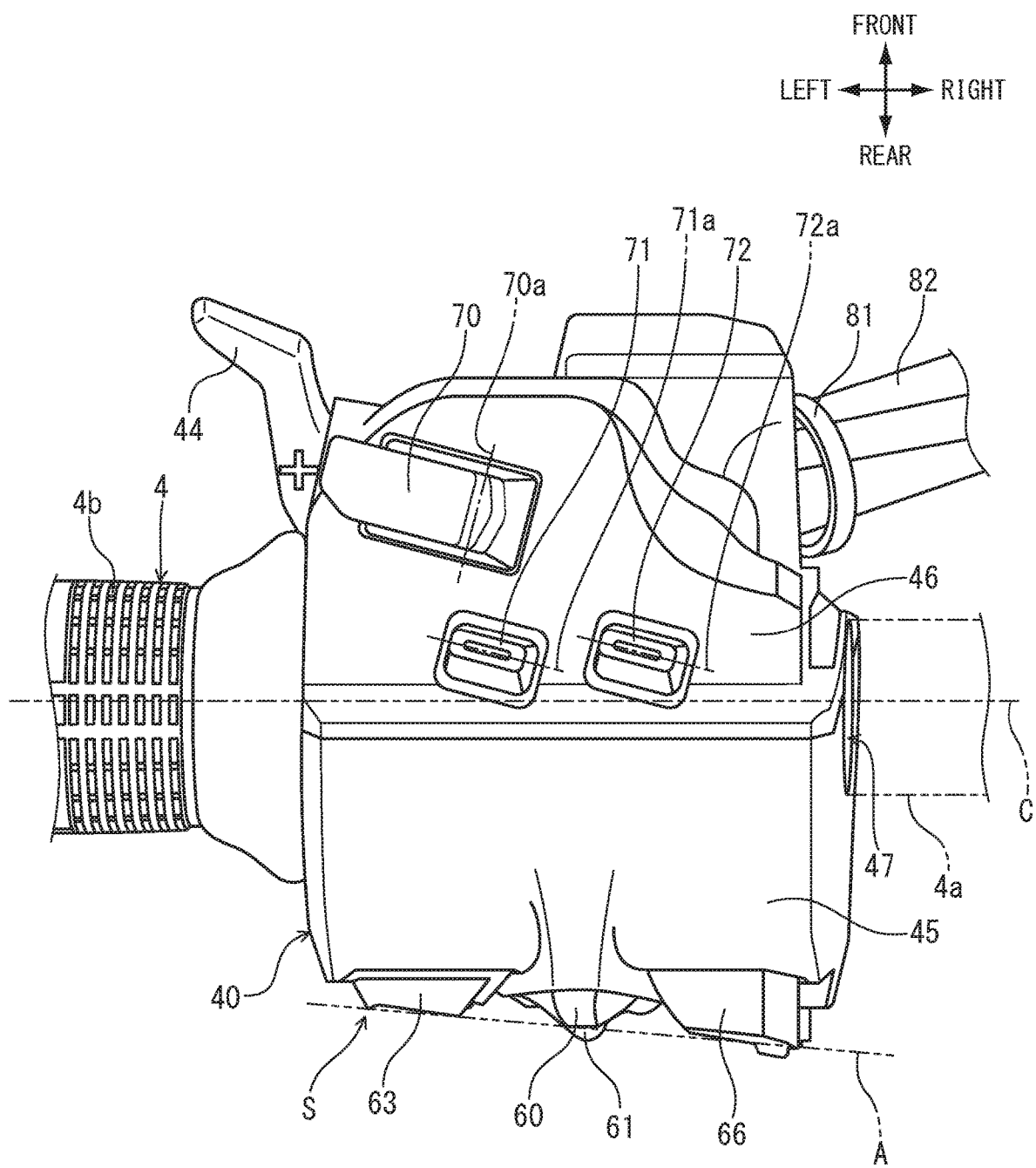
FIG. 4 is a plan view of the handlebar switch.

FIG. 3 is a front view of the left-side handlebar switch 40, as viewed from the rear of the vehicle body. FIG. 4 is a plan view of the handlebar switch 40. The handlebar switch 40 includes, as a switch case formed of, for example, a hard resin, a front-side case 46 and a rear-side case 45. The front-side case 46 is disposed anteriorly in the vehicle body. The rear-side case 45 is disposed posteriorly in the vehicle body. The front-side case 46 is connected with the rear-side case 45 to thereby form a circular through hole 47, in which the handlebar 4a is clamped and positioned.

The switches S, which include nine switches, include direction switches 60, 61, and 62 which are disposed in juxtaposition with each other vertically at a central position in the vehicle width direction. The direction switches 60, 61, and 62 specify directions of up, down, left, and right for, for example, an operation menu displayed on the multi-display 99. The direction switches 60, 61, and 62 include an up switch 60, a down switch 62, and a left-right switch 61. The up switch 60 is paired up with the down switch 62. The up switch 60 and the down switch 62 are depression switches specifying vertical directions. The left-right switch 61 is a tilting switch disposed between the up switch 60 and the down switch 62 to specify a left or right direction.

A favorite switch 63 is disposed on the left side of the up switch 60. The favorite switch 63 serves as an electric component operating switch that performs any assigned function, including changeover of a traveling mode or traction control. An enter switch 64, which validates a choice made by operating the direction switches 60, 61, and 62, is disposed on the left of the left-right switch 61. A horn switch 65, as an electric component operating switch that sounds a horn, is disposed on the left of the down switch 62. A guide protrusion 53, which prevents erroneous operation of a switch, is disposed inferior to the horn switch 65.

A rapid return switch 66, which performs, for example, rewinding during audio playback, is disposed on the right of the up switch 60. A return switch 67, which performs an operation of, for example, bringing a display item of the multi-display 99 back to the previous one, is disposed on the right of the left-right switch 61. A rapid traverse switch 68 is disposed on the right of the down switch 62.

The direction switches 60, 61, and 62, the enter switch 64, and the return switch 67 are disposed on a central plane 49 which forms a substantially crisscross shape in a front view. The favorite switch 63, the horn switch 65, the rapid return switch 66, and the rapid traverse switch 68 are disposed on a case front face 50 which is one step lower than the central plane 49 toward the front of the vehicle body. A harness 82 protrudes from a lower end portion on an inside in the vehicle width direction of the handlebar switch 40. The harness 82 is fixed to a support protrusion 80 by a tie wrap 81.

The present invention is characterized in that the direction switches 60, 61, and 62, which specify directions of up, down, left, and right, are disposed in one vertical row by integrating the left-right switch 61 in a single tilting switch. Through this configuration, a space occupied by the left-right switch 61 in a crosswise direction is reduced. In particular, by disposing the enter switch 64 and the return switch 67 close to, and on the left and right of, the left-right switch 61, reduction in size of the handlebar switch 40 can be promoted, while disposing a plurality of switches. The enter switch 64, the left-right switch 61, and the return switch 67 are disposed in one horizontal row overlapping an axis C of the handlebar 4a in the front view illustrated in FIG. 3.

A first switch displacement surface 51, which is one step lower than the case front face 50 toward the front of the vehicle body, is formed inferior to the switches S. The hazard lamp switch 41 and the flasher lamp switch 42 are disposed side-by-side in the left-right direction on the first switch displacement surface 51. In addition, a second switch displacement surface 52, which is one step lower than the first switch displacement surface 51 toward the front of the vehicle body, is formed inferior to the first switch displacement surface 51. The downshift switch 43 is disposed on the second switch displacement surface 52. Having the two disposition surfaces two steps lower toward the front of the vehicle body at a position inferior to the switches S as described above enables operability of the flasher lamp switch 42, the hazard lamp switch 41, and the downshift switch 43 to be enhanced and erroneous operations to be effectively prevented.

The guide protrusion 53, which prevents the horn switch 65 instead of the flasher lamp switch 42 from being mistakenly operated, or vice versa, is disposed inferior to the horn switch 65. Additionally, the upshift switch 44 is an oscillating switch that is disposed, in the front view illustrated in FIG. 3, at a height equal to a height at which the flasher lamp switch 42 is disposed and that protrudes from an outer side surface in the vehicle width direction of the front-side case 46.

Reference is made to FIG. 4. Tilting upper-portion switches 70, 71, and 72, which include operators protruding superiorly, are disposed on an upper surface of the front-side case 46. Of the upper-portion switches 70, 71, and 72, a speech switch 71 is operated to converse over, for example, an intercom system or a telephone, and a function switch 72 is used to select a function. Tilting axes 71a and 72a of the speech switch 71 and the function switch 72, respectively, are tilted such that an outside in the vehicle width direction of the tilting axes 71a and 72a is located anteriorly in the vehicle body relative to an inside in the vehicle width direction of the tilting axes 71a and 72a, to reflect a direction in which a left hand forefinger is bent during an operation of the left hand forefinger. A light-beam-axis switching/passing switch 70 of the headlight 12 is disposed anterior to the speech switch 71. The light-beam-axis switching/passing switch 70 has a tilting axis 70a oriented in a direction substantially perpendicular to the tilting axis 71a of the speech switch 71. An erroneous operation is thereby prevented from occurring between the light-beam-axis switching/passing switch 70 and the speech switch 71.

A total eight switches excluding the left-right switch 61 out of the switches S have operating surfaces configured so as to be located gradually posteriorly in the vehicle body toward the inside in the vehicle width direction from the outside in the vehicle width direction, as indicated by the chain double-dashed line A illustrated in FIG. 4. When any other of the switches S is to be operated with the left hand thumb, the foregoing configuration allows the ball of the left hand thumb to readily touch the switch even when the switch is located far from the handlebar grip 4b. This facilitates a depressing operation.

Figure 5:
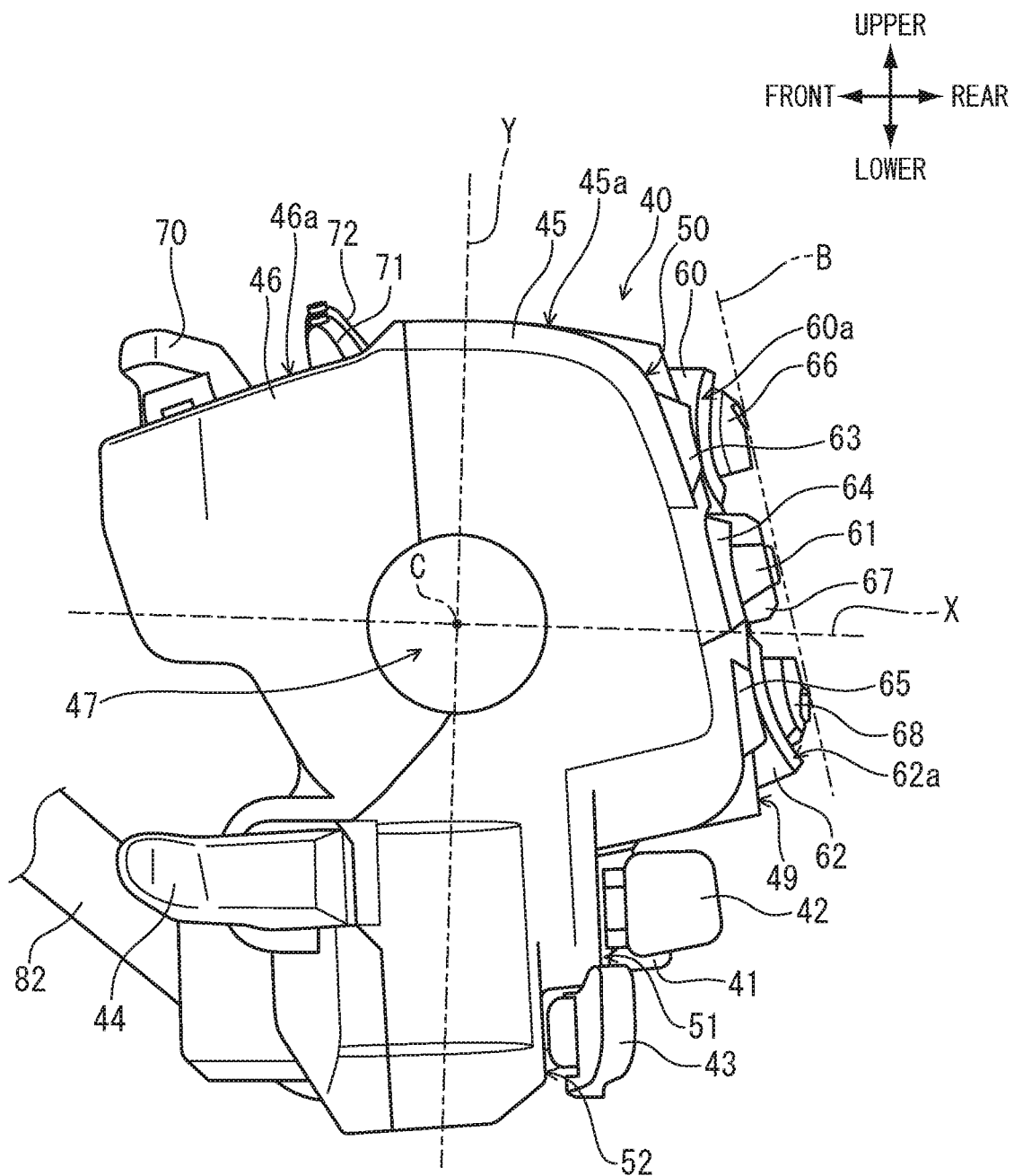
FIG. 5 is a side view of the handlebar switch, as viewed from the outside in the vehicle width direction.

FIG. 5 is a side elevational view of the handlebar switch 40, as viewed from the outside in the vehicle width direction. The rear-side case 45 has an upper surface 45a inclined superiorly toward the front relative to a horizontal line X. The front-side case 46 has an upper surface 46a inclined inferiorly toward the front relative to the horizontal line X. The light-beam-axis switching/passing switch 70, the speech switch 71, and the function switch 72 are disposed on the upper surface of the front-side case 46. The speech switch 71 and the function switch 72, in particular, are disposed closer to the rear-side case 45 and in juxtaposition with each other in the left-right direction at positions one step lower than the upper surface 45a of the rear-side case 45. This configuration facilitates an operation with the forefinger of the left hand that holds the handlebar grip 4b and allows an erroneous operation to be prevented from occurring between the light-beam-axis switching/passing switch 70, and the speech switch 71 and the function switch 72.

The operating surfaces of the switches S are configured so as to be located gradually anteriorly in the vehicle body from a lower portion in the vehicle body upwards along a chain double-dashed line B which is inclined with respect to a vertical line Y. The operating surfaces of the switches S are thereby oriented toward an occupant side which further enhances operability. Each of the switches S forming a middle row and an upper row is disposed superior to the horizontal line X which passes through the axis C of the handlebar 4a.

An operating surface 60a of the up switch 60 and an operating surface 62a of the down switch 62 are each formed into an arcuate shape having a protrusion amount protruding toward the rear of the vehicle body increasing at increasing distances upward and downward, respectively, from the left-right switch 61 in a vehicle body side view (view in an axial direction of the handlebar 4a). This enhances a sense of fit of a finger in the up switch 60 and the down switch 62, enhancing operability and preventing an erroneous operation.

Figure 6:
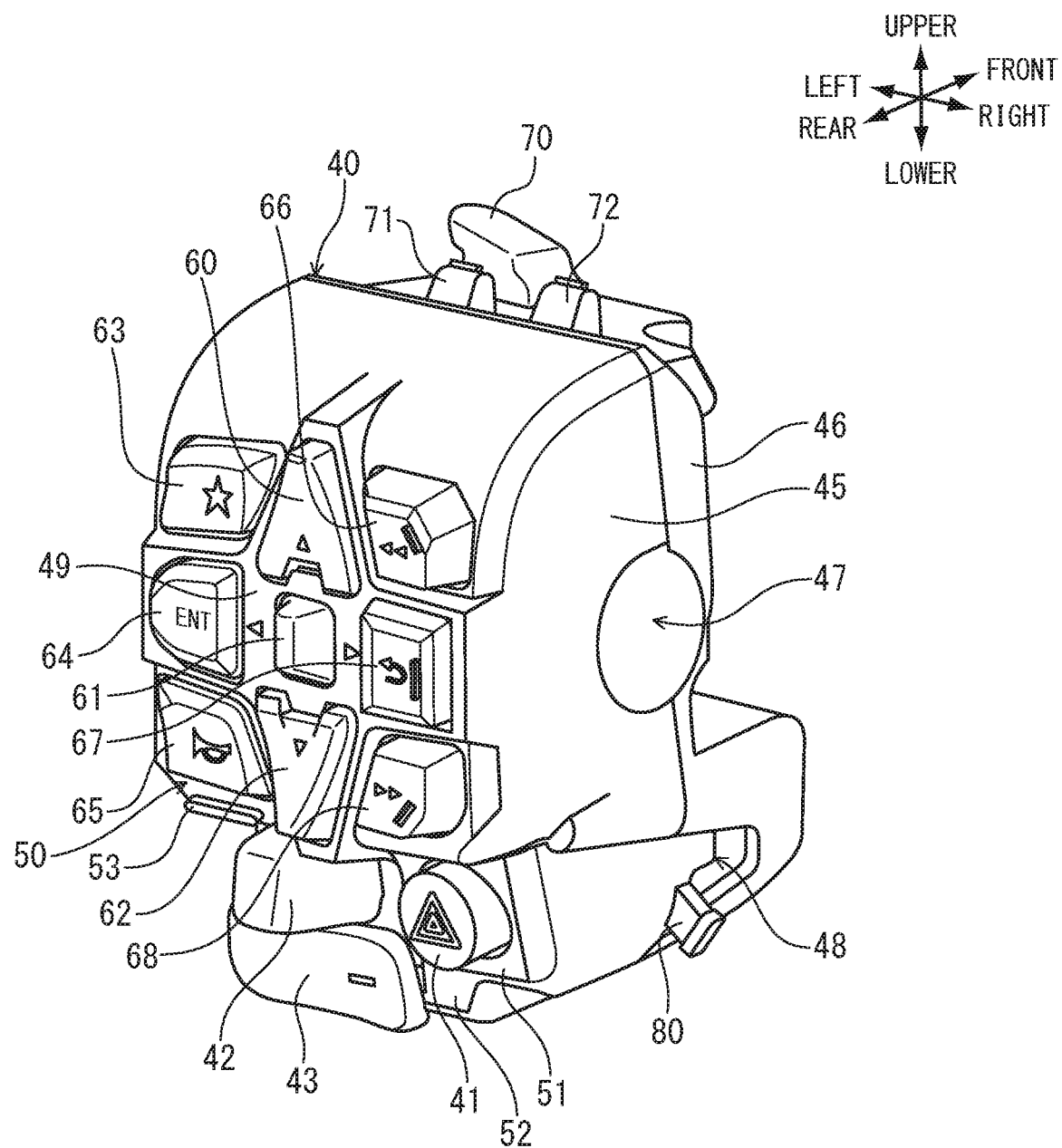
FIG. 6 is a perspective view of the handlebar switch, as viewed from a rear upper right direction of the vehicle body.
Figure 7:
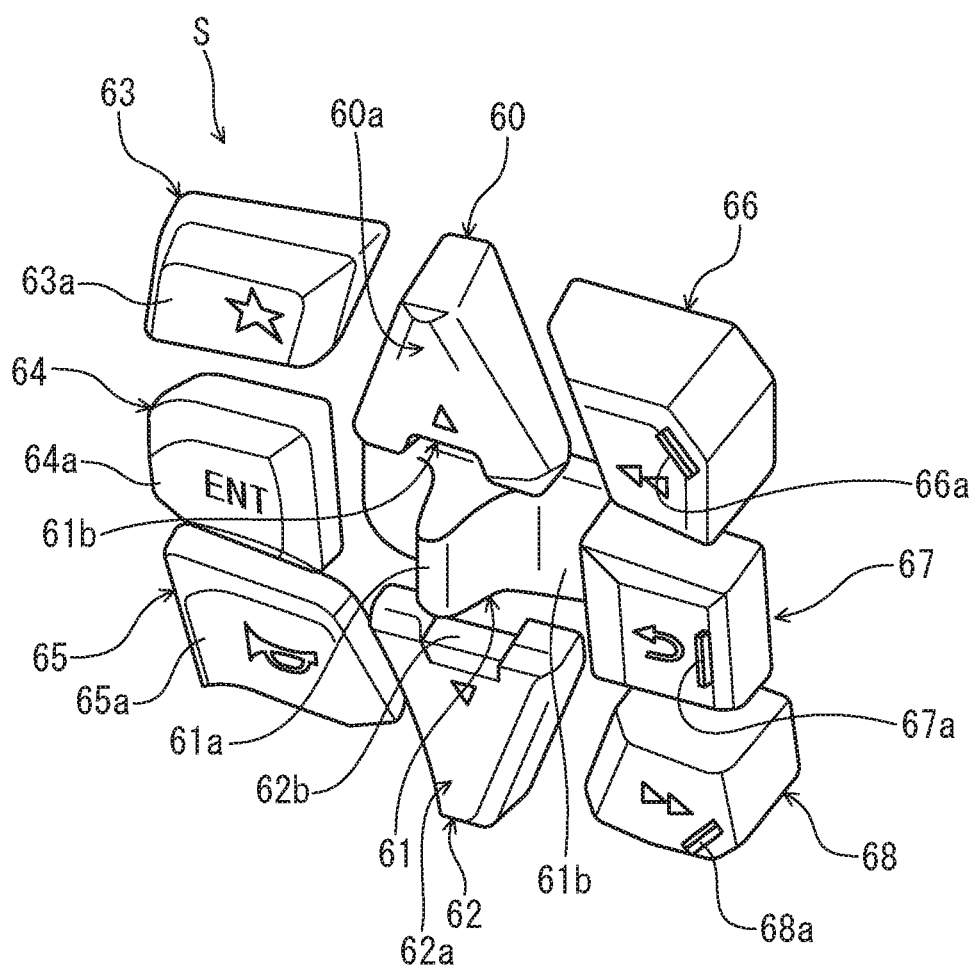
FIG. 7 is a perspective view illustrating shapes of the switches disposed on the handlebar switch.

FIG. 6 is a perspective view of the handlebar switch 40, as viewed from a rear upper right direction of the vehicle body. FIG. 7 is a perspective view illustrating shapes of the switches disposed on the handlebar switch 40. Connecting the rear-side case 45 with the front-side case 46 forms the through hole 47, through which the handlebar 4a is passed, and a harness pass-through hole 48 at a position posterior to the support protrusion 80 which correctly positions the tie wrap 81.

In the present embodiment, the left-right switch 61 is a tilting switch and disposed between the up switch 60 and the down switch 62, and the enter switch 64 and the return switch 67, disposed at the left and right of the left-right switch 61, are disposed on the central plane 49 which forms a substantially crisscross shape and protrudes posteriorly in the vehicle body. Thus, the switches that are frequently used and closely related with each other are arranged in a substantially crisscross shape to thereby enhance operability. Additionally, the arrangement achieves a visual effect of enabling intuitive recognition of relations among the switches.

The left-right switch 61 includes a base portion 61b and an operating portion 61a. The base portion 61b has an electric contact. The operating portion 61a protrudes posteriorly in the vehicle body from a center of the base portion 61b. The operating portion 61a protrudes from a rectangular opening formed in the rear-side case 45. The operating portion 61a has a posterior side end portion protruding posteriorly in the vehicle body relative to the operating surface 60a of the up switch 60 and the operating surface 62a of the down switch 62. The up switch 60 and the down switch 62 are thereby prevented from being erroneously operated when the left-right switch 61 is to be operated. The up switch 60 and the down switch 62 are each formed to increase a thickness at increasing distances from the left-right switch 61. This configuration facilitates a depression operation at a position away from the center and prevents an erroneous operation with switches adjacent to the up switch 60 and the down switch 62 at left and right. The up switch 60 and the down switch 62 have recessed portions 60b and 62b, respectively which are formed to be recessed from the shape of the operating portion 61a of the left-right switch 61. The disposition of the up switch 60 and the down switch 62 close to the left-right switch 61 while preventing an erroneous operation achieves an effect of visually stressing correlation among these switches.

The rapid return switch 66, the return switch 67, and the rapid traverse switch 68 are provided with operation guide protrusions 66a, 67a, and 68a, respectively. The operation guide protrusions 66a, 67a, and 68a are disposed at right end portions of the respective switches 66, 67, and 68. The operation guide protrusions 66a, 67a, and 68a each have a function of assisting in the depression operation by providing a hook against which the left hand thumb is caught when stretching. The operation guide protrusions 66a and 68a of the rapid return switch 66 and the rapid traverse switch 68, respectively, are inclined so as to correspond to directions in which the thumb abuts.

As described above, according to the handlebar switch 40 of the present invention, since the left-right switch 61 as a direction switch is the tilting type and the left-right switch 61 is disposed between the up switch 60 and the down switch 62 to form one vertical row, reduction in size of the switch case can be promoted while disposing a plurality of switches on the switch case.

Note that the type of the motorcycle, structure of the handlebar switch, shapes and structures of the front-side and rear-side cases, shapes and disposition of the direction switches, shapes and disposition of other switches, functions assigned to the functional switches, and the like are not limited to those in the above-described embodiment, and various modifications can be made therein. The handlebar switch according to the present invention can be applied to various types of vehicles including a saddled tricycle and four-wheeled vehicle including a handlebar.

REFERENCE SIGNS LIST

1 . . . motorcycle, 4 . . . steering handlebar, 4a . . . handlebar, 4b . . . handlebar grip, 40 . . . handlebar switch, 45 . . . rear-side case (switch case), 45a . . . upper surface of rear-side case, 46 . . . front-side case (switch case), 56a . . . upper surface of front-side case, 60 . . . up switch (direction switch), 60a . . . operating surface of up switch, 61 . . . left-right switch (direction switch), 61a . . . operating portion of left-right switch, 62 . . . down switch (direction switch), 62a . . . operating surface of down switch, 63 . . . favorite switch (electric component operating switch), 64 . . . enter switch, 65 . . . horn switch (electric component operating switch), S . . . switches, 63,64,65,66,67, 68 . . . other switch, 71 . . . speech switch (upper-portion switch), 71a . . . tilting axis of speech switch, 72 . . . function switch (upper-portion switch), 72a . . . tilting axis of function switch

The invention claimed is:

1. A handlebar switch comprising:
switch cases disposed on a handlebar inside a handlebar grip in a vehicle width direction; and
a plurality of switches disposed on the switch cases,
wherein the switches include direction switches that specify up, down, left, and right directions,
wherein the direction switches are disposed to form one vertical row,
wherein the direction switches include a pair of upper and lower depressing and down switches that specify up and down directions, respectively, and a tilting left-right switch that is disposed between the up and down switches and that specifies a left or right direction,
wherein the up and down switches have operating surfaces formed to have a protrusion amount protruding toward a rear of a vehicle body, the protrusion amount increasing at increasing distances upward and downward, respectively, from the left-right switch when viewed in an axial direction of the handlebar,
wherein the left-right switch includes an operating portion that protrudes posteriorly in the vehicle body, and
wherein the operating portion has a posterior side end portion protruding posteriorly in the vehicle body relative to the operating surfaces of the up and down switches.

2. The handlebar switch according to claim 1, wherein other switches are disposed at a left and right of the direction switches.

3. The handlebar switch according to claim 2, wherein the other switches disposed outside the direction switches in the vehicle width direction include an enter switch that validates a choice made by operating the direction switches and operating switches that operate electric components disposed in a vehicle.

4. The handlebar switch according to claim 2, wherein the direction switches and the other switches each have an operating surface configured so as to be located posteriorly in the vehicle width direction toward an inside in the vehicle width direction in a vehicle top view.

5. The handlebar switch according to claim 1, further comprising:
at least one of tilting upper-portion switches disposed on an upper surface of the switch cases, the upper-portion switches including operators protruding superiorly in the vehicle body,
wherein the upper-portion switches have tilting axes tilted such that, in a vehicle top view, an outside end portion in the vehicle width direction of the tilting axes is located anteriorly in the vehicle body relative to an inside end portion in the vehicle width direction of the tilting axes.

6. The handlebar switch according to claim 5,
wherein the switch cases include a rear-side case on a posterior side in the vehicle body and a front-side case on an anterior side in the vehicle body,
wherein the rear-side case has an upper surface inclined superiorly in the vehicle body toward a front,
wherein the front-side case has an upper surface inclined inferiorly in the vehicle body toward the front, and
wherein the upper-portion switches are disposed on the upper surface of the front-side case at a position lower than the upper surface of the rear-side case when viewed in the axial direction of the handlebar.

7. The handlebar switch according to claim 3, wherein the direction switches and the other switches each have an operating surface configured so as to be located posteriorly in the vehicle width direction toward an inside in the vehicle width direction in a vehicle top view.

8. The handlebar switch according to claim 2, further comprising:
at least one of tilting upper-portion switches disposed on an upper surface of the switch cases, the upper-portion switches including operators protruding superiorly in the vehicle body, wherein the upper-portion switches have tilting axes tilted such that, in a vehicle top view, an outside end portion in the vehicle width direction of the tilting axes is located anteriorly in the vehicle body relative to an inside end portion in the vehicle width direction of the tilting axes.

9. The handlebar switch according to claim 3, further comprising:
at least one of tilting upper-portion switches disposed on an upper surface of the switch cases, the upper-portion switches including operators protruding superiorly in the vehicle body,
wherein the upper-portion switches have tilting axes tilted such that, in a vehicle top view, an outside end portion in the vehicle width direction of the tilting axes is located anteriorly in the vehicle body relative to an inside end portion in the vehicle width direction of the tilting axes.

10. The handlebar switch according to claim 4, further comprising:
at least one of tilting upper-portion switches disposed on an upper surface of the switch cases, the upper-portion switches including operators protruding superiorly in the vehicle body,
wherein the upper-portion switches have tilting axes tilted such that, in a vehicle top view, an outside end portion in the vehicle width direction of the tilting axes is located anteriorly in the vehicle body relative to an inside end portion in the vehicle width direction of the tilting axes.

11. A handlebar switch comprising:
switch cases disposed on a handlebar inside a handlebar grip in a vehicle width direction;
a plurality of switches disposed on the switch cases,
wherein the switches include direction switches that specify up, down, left, and right directions,
wherein the direction switches are disposed to form one vertical row,
wherein the handle bar switch further comprises at least one of tilting upper-portion switches disposed on an upper surface of the switch cases, the upper-portion switches including operators protruding superiorly in the vehicle body,
wherein the upper-portion switches have tilting axes tilted such that, in a vehicle top view, an outside end portion in the vehicle width direction of the tilting axes is located anteriorly in the vehicle body relative to an inside end portion in the vehicle width direction of the tilting axes,
wherein the switch cases include a rear-side case on a posterior side in the vehicle body and a front-side case on an anterior side in the vehicle body,
wherein the rear-side case has an upper surface inclined superiorly in the vehicle body toward a front,
wherein the front-side case has an upper surface inclined inferiorly in the vehicle body toward the front, and
wherein the upper-portion switches are disposed on the upper surface of the front-side case at a position lower than the upper surface of the rear-side case when viewed in the axial direction of the handlebar.

* * * * *